United States Patent Office 2,729,663
Patented Jan. 3, 1956

2,729,663

FLUORINE AND SULFUR COMPOUNDS

Earl L. Muetterties, Hockessin, Del., assignor to E. I. du Pont de Nemours and Company, Wilmington, Del., a corporation of Delaware No Drawing. Application August 20, 1954,
Serial No. 451,301

5 Claims. (Cl. 260—431)

This invention relates to preparation of fluorine-containing compounds, particularly trifluoromethyl compounds including those containing trifluoromethylthiyl groups.

A known method of preparation for bis(trifluoromethylthio)mercury, i. e., $Hg(SCF_3)_2$, which may be regarded as a salt of trifluoromethanethiol, involves the radiation of bistrifluoromethyl disulfide in the presence of mercury, usually for a total time on the order of days. Bistrifluoromethyl disulfide may be prepared by reaction of sulfur with trifluoroiodomethane or by reaction of carbon disulfide with iodine pentafluoride, neither of these methods being desirable because of their relatively slow reaction rates and the scarcity and consequent cost of the necessary fluorine compounds. Bis(trifluoromethylthio)mercury is especially interesting because of its value as an intermediate in preparation of other useful compounds containing the trifluoromethylthiyl group, i. e., $-SCF_3$, as well as being an active fungicide.

A primary object of the present invention is provision of a direct process of preparing bis(trifluoromethylthio)-mercury from readily available starting materials. Another object is novel preparation of compounds containing trifluoromethyl groups. Other objects will be apparent from the following description of the invention.

In general the above objects are accomplished according to the present invention by reacting carbon disulfide and mercuric fluoride at temperature within the range from about 100° C. to about 500° C. Bis(trifluoromethylthio)mercury predominates as reaction product in the lower part of this temperature range. Bistrifluoromethyl disulfide occurs as a reaction product above about 250° C. and predominates from about 300° C. to the top of the stated range, bistrifluoromethyl sulfide also occurring in the latter part of the range. Temperatures below the stated range are relatively ineffective, and temperatures above the stated range are conducive to formation of carbon tetrafluoride, which becomes practically the sole product of reaction in the vicinity of 800° C. Reaction of carbon disulfide and mercuric fluoride can be carried out in either static or flow system; a reaction vessel of nickel or the alloy known as "Hastelloy C" is satisfactory. About one to three hours suffice to complete the reaction; it is essentially independent of pressure, which may be superatmospheric or even subatmospheric, though dependent upon temperature as indicated herein.

Mercuric fluoride, i. e., mercury II fluoride, for use as described herein may be prepared conveniently from mercury II oxide and hydrogen fluoride as described in my copending patent application, Serial No. 418,766, filed March 25, 1954. The present invention is exemplified below, all parts and percentages being expressed by weight unless otherwise indicated.

*Example I*

A nickel tubular reactor was charged with 250 parts of mercury II fluoride and heated to 400° C. A gaseous mixture of carbon disulfide and nitrogen was passed through the reactor. A total of 38 parts of carbon disulfide was passed through in a period of two hours, and the temperature varied from 460–495° C. The volatile products were collected in conventional glass traps which were cooled with liquid nitrogen. Analysis of the products by their infrared spectra and boiling points showed 16 parts bistrifluoromethyl disulfide, 1 part carbon tetrafluoride, traces of perfluoroethane, and unreacted carbon disulfide.

*Example II*

A "Hastelloy C" lined vessel was charged with 140 parts of mercury II fluoride and 50 parts of carbon disulfide. The vessel was closed and heated to 250° C. for a period of 3 hours. The vessel was then cooled to 40° C., and the volatile products were fractionally distilled. Six parts of bistrifluoromethyl disulfide and unreacted carbon disulfide were obtained. The solid product in the reaction vessel was removed and heated in a sublimer at 90° C. and atmospheric pressure. In this manner, 46 parts of sublimed bis(trifluoromethylthio)mercury was obtained (M. P. found 37–38° C.; reported 37.5° C.), the residue from the sublimation consisting of mercury II sulfide (hexagonal) as shown by X-ray analysis.

*Example III*

A "Hastelloy C" lined vessel was charged with 140 parts of mercury II fluoride and 50 parts of carbon disulfide. The vessel was closed and heated to 250° C. for a period of 3 hours. The vessel was then cooled to 40° C., and the volatile products were fractionally distilled. The volatile products from the reaction consisted of bistrifluoromethyl sulfide, bistrifluoromethyl disulfide, carbon tetrafluoride, and unreacted carbon disulfide as shown by infrared analysis. Forty-six parts of bis(trifluoromethylthio)mercury was recovered from the solid residue in the reaction vessel by sublimation.

*Analysis.*—Calc'd for $HgS_2C_2F_6$: C, 5.95; Hg, 49.8; reported M. P. 37.5° C. Found: C, 5.83; Hg, 50.96; M. P. 37–38° C.

The solid residue from the sublimation was shown by X-ray analysis to be mercury II sulfide (hexagonal).

*Example IV*

A "Hastelloy C" lined vesel was charged with 40 parts of carbon disulfide and 80 parts of mercury II fluoride, and the vessel was closed. On rapid heating, an exothermic reaction began at 200° C. and became rapid at 220° C. White solid bis(trifluoromethylthio)mercury was formed.

*Example V*

A "Hastelloy C" lined vessel was charged with 140 parts of mercury II fluoride and 50 parts of carbon disulfide. On heating the closed reaction vessel, an exothermic reaction took place at 110° C. The reactor was further heated to 150° C. for a period of three hours. The products were found to consist of 61 parts of bis(trifluoromethylthio)mercury (M. P. 37–38° C.), about 2 parts of bistrifluoromethyl disulfide, and unreacted carbon disulfide. The non-volatile residue was shown by X-ray analysis to consist of mercury II sulfide (cubic and hexagonal) and unreacted mercury II fluoride.

*Example VI*

A "Hastelloy C" lined vessel was charged with 140 parts of mercury II fluoride and 50 parts of carbon disulfide. The vessel was closed and heated to 460° C. The products obtained did not contain any bis(trifluoromethylthio)mercury. The major volatile products were bistrifluoromethyl sulfide and disulfide (about equal parts) and unreacted carbon disulfide. The solid product consisted of mercury II sulfide (hexagonal) as shown by X-ray analysis.

Example VII

A nickel tube was charged with 200 parts of mercury II fluoride and heated to 250° C. A gaseous mixture of carbon disulfide and nitrogen was passed through this tube over a period of 2¾ hours. During this period, the temperature varied from 200°–250° C. The volatile products were collected in a conventional glass trap cooled with liquid nitrogen. These products were analyzed by their infrared spectra and by distillation. They contained about four parts of bistrifluoromethyl disulfide and unreacted carbon disulfide. It was found that when the reactor tube was opened, 14 parts of bis(trifluoromethylthio)mercury had sublimed to the cooler portions of the reactor tube. This material was identified by its melting point of 37–38° C. The remainder of the solid materials was placed in a sublimer and heated to 90° C. at atmospheric pressure to sublime off remaining traces of the mercury salt, of which another 29.1 parts was obtained in this manner.

Bis(trifluoromethylthio)mercury is particularly useful as a ready source of the trifluoromethylthiyl group, which is of greatly increasing technical interest. This mercury compound can be prepared easily according to the present invention, and it keeps indefinitely in vacuum. Reactions of it include combination with hydrogen chloride to form trifluoromethanethiol and with chlorine to form trifluoromethanesulfenyl chloride. Although purification of bis(trifluoromethylthio)mercury by sublimation, as described above, is often useful preparatory to further reaction, production of the essentially pure compound at not more than 250° C. according to the present invention may be combined with additional steps to give a different ultimate product, an over-all process that usually may be carried out in continuous flow manner, if desired.

Many metals and metal salts react with this compound, the metal replacing the mercury therein; elemental mercury or the corresponding mercury salt is a consequent by-product. The simple metal displacement reaction:

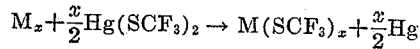

where $x$ is the valence of metal M, is satisfied by copper, among other metals. For the salts, a similar reaction may be expressed generally as follows:

where $x$ is valence as before.

The following examples, in which parts and percentages are expressed by weight unless otherwise indicated, describe more fully some of the reactions mentioned above.

Example A

A solution of 11 parts of silver nitrate in 100 parts of distilled water was added to slurry of 20 parts of bis(trifluoromethylthio)mercury in 100 parts of distilled water. A copious white precipitate formed immediately. The resultant slurry was stirred for one-half hour and then filtered. The solid material was washed with water and finally with ether. It was then dried in vacuum at 50° C. for 16 hours. In this manner, 16 parts of crude trifluoromethylthiosilver was obtained. The crude salt was purified by recrystallization from acetone.

*Analysis.*—Calc'd for $AgSCF_3$: Ag, 51.70%; C, 5.74%. Found: Ag, 53.70%; C, 5.32%.

Example B

Nine parts of bis(trifluoromethylthio)mercury and 6 parts of finely divided copper were mixed in a small flask and heated. An exothermic reaction took place near 80°–100° C. A bright orange-yellow color developed. The flask was further heated for a period of one-half hour at about 150° C. Material in the flask was then extracted with ether. The ether extract upon concentration yielded a pale green solid which upon analysis was shown to be trifluoromethylthiocopper.

*Analysis.*—Calc'd for $CuSCF_3$: Cu, 38.60%; C, 7.30%. Found: Cu, 36.14%; C, 8.95%.

This copper derivative tends to hold basic solvent molecules tenaciously. It recrystallizes from acetonitrile with one molecule of acetonitrile. Heating this complex salt under vacuum at 50° C. and for extended periods did not remove all of the acetonitrile.

The claimed invention:

1. Process of obtaining a trifluoromethyl compound comprising reacting carbon disulfide and mercuric fluoride at temperature within the range from 100° C. to about 500° C.

2. The process of claim 1 in which the reaction temperature is from about 300° C. to about 500° C. and the major product is bistrifluoromethyl disulfide.

3. The process of claim 1 in which the reaction temperature is from about 100° C. to about 300° C. and the major product is bis(trifluoromethylthio)mercury.

4. The process of claim 3 plus the step of subliming solid product in the vicinity of 90° C. at atmospheric pressure, whereby substantially pure bis(trifluoromethylthio)mercury is obtained.

5. The process of claim 3 in which the reaction temperature is at most 250° C. and the product consists essentially of bis(trifluoromethylthio)mercury.

References Cited in the file of this patent

Nature, vol. 166, page 225 (1950).
Jour. Chem. Soc. (1952), pages 2198–2205.